(12) United States Patent
Singh et al.

(10) Patent No.: US 11,615,786 B2
(45) Date of Patent: Mar. 28, 2023

(54) SYSTEM TO CONVERT PHONEMES INTO PHONETICS-BASED WORDS

(71) Applicant: Medyug Technology Private Limited, Bangalore (IN)

(72) Inventors: Baljit Singh, Bengaluru (IN); Praveen Prakash, Bengaluru (IN)

(*) Notice: Subject to any disclaimer, the term of this patent is extended or adjusted under 35 U.S.C. 154(b) by 277 days.

(21) Appl. No.: 16/810,373

(22) Filed: Mar. 5, 2020

(65) Prior Publication Data

US 2020/0286471 A1    Sep. 10, 2020

(30) Foreign Application Priority Data

Mar. 5, 2019 (IN) .............................. 201941008482

(51) Int. Cl.
*G10L 15/187* (2013.01)
*G10L 15/02* (2006.01)
*G10L 15/22* (2006.01)

(52) U.S. Cl.
CPC ............ *G10L 15/187* (2013.01); *G10L 15/02* (2013.01); *G10L 15/22* (2013.01); *G10L 2015/025* (2013.01)

(58) Field of Classification Search
CPC ........ G10L 15/187; G10L 15/02; G10L 15/22
See application file for complete search history.

(56) References Cited

U.S. PATENT DOCUMENTS

| | | | | |
|---|---|---|---|---|
| 2003/0018475 | A1* | 1/2003 | Basu | G06V 40/161 |
| | | | | 704/E11.003 |
| 2011/0224978 | A1* | 9/2011 | Sawada | G10L 15/25 |
| | | | | 704/E15.001 |
| 2014/0081641 | A1* | 3/2014 | Longe | G10L 15/32 |
| | | | | 704/257 |
| 2015/0287403 | A1* | 10/2015 | Holzer Zaslansky | |
| | | | | G06T 13/205 |
| | | | | 704/231 |
| 2016/0155436 | A1* | 6/2016 | Choi | G10L 15/183 |
| | | | | 704/232 |
| 2017/0061966 | A1* | 3/2017 | Marcheret | G10L 21/02 |
| 2018/0190284 | A1* | 7/2018 | Singh | G10L 25/51 |
| 2019/0279642 | A1* | 9/2019 | Shukla | G10L 15/25 |
| 2020/0082808 | A1* | 3/2020 | Li | G10L 15/08 |
| 2020/0294497 | A1* | 9/2020 | Kirazci | G10L 13/027 |
| 2020/0357407 | A1* | 11/2020 | Mossinkoff | H04N 5/23219 |

* cited by examiner

*Primary Examiner* — Mark Villena
(74) *Attorney, Agent, or Firm* — Nasr Patent Law LLC; Faisal K. Abou-Nasr

(57) ABSTRACT

A system to convert phonemes into phonetics-based words that is implemented in one or more computing systems, in association with a system that provides required inputs is disclosed. Said system comprises a phoneme enhancer, a phoneme sequence buffer, a phoneme sequence to phonetics-based word converter that comprises a sliding window phoneme sequence matcher, a phoneme sequence to phonetics-based word custom data memory, a most frequent phonetics-based word predictive memory, a phoneme similarity matrix, and a phonetics-based word output unit.

3 Claims, 3 Drawing Sheets

SYSTEM TO CONVERT PHONEMES INTO PHONETICS-BASED WORDS

CROSS REFERENCE TO EARLIER APPLICATIONS

The present disclosure is based on the Indian Patent Application, bearing Application Number 201941008482, dated Mar. 5, 2019.

FIELD OF THE INVENTION

The present disclosure is generally related to a system to convert phonemes into phonetics-based words.

BACKGROUND OF THE INVENTION

Most of the speech to text software tools available today tries to jump directly to text spellings. Specially, the Artificial Neural Network based algorithms would not cater to specific boundaries. The statistical Machine Learning (ML) based solutions in speech to text do create acoustic and language models separately. However, still statistical ML algorithms goal is to reach the text spellings directly.

The issue with text spellings is that they only make sense when meaning is resolved. Which is usually taken in the above algorithms as immediate context and is mostly statistical context. However, we know that even a human who does not know how to read and write is capable of communicating and understanding language. Hence, there is no fundamental need to resolve the spelled words.

There is, therefore, a need in the art for a system to convert phonemes into phonetics-based words that overcomes the aforementioned problems and drawbacks.

SUMMARY OF THE INVENTION

A system to convert phonemes into phonetics-based words that is implemented in one or more computing systems, in association with a system that provides required inputs is disclosed. Said system comprises a phoneme enhancer, a phoneme sequence buffer, a phoneme sequence to phonetics-based word converter that comprises a sliding window phoneme sequence matcher, a phoneme sequence to phonetics-based word custom data memory, a most frequent phonetics-based word predictive memory, a phoneme similarity matrix, and a phonetics-based word output unit.

The phoneme enhancer takes both voice sounds and visual hints as inputs, and merges them to form a phoneme. The phoneme sequence buffer facilitates the storing of an incoming sequence of phonemes, until they are stored into a meaningful thought representation. The phoneme sequence to phonetics-based word custom data memory takes a sequence of phonemes as input, and outputs either a fully matching phonetics-based word, or most matching phonetics-based words. The phoneme sequence to phonetics-based word custom data memory is an associative memory, which is either a look-up memory, or is implemented using any statistical Artificial Intelligence modeling.

The most frequent phonetics-based word predictive memory is configured to imitate a human brain, which can predict what could come next. The phoneme similarity matrix is a simple key value store, which has a list of phonemes that are similar.

The phoneme sequence to phonetics-based word converter is the heart of the system. Said phoneme sequence to phonetics-based word converter controls all the data flow across various other modules, and does reasoning, prioritization, and disambiguation. The phoneme sequence to phonetics-based word converter takes phoneme sequences as input from the phoneme sequence to phonetics-based word custom data memory, the phonetics-based word predictive memory, and the phoneme similarity matrix, to get the best possible phonetics-based word sequence. The phoneme sequence to phonetics-based word converter interacts with a master controller of a language understanding system to send and receive signals, and the output is forwarded for checking the meaning.

The phonetics-based word output unit comprises the sequence of phonetics-based words that are output from the system.

DESCRIPTION OF THE INVENTION

Throughout this specification, the use of the word "comprise" and "include", and variations such as "comprises", "comprising", "includes", and "including" may imply the inclusion of an element or elements not specifically recited.

Throughout the specification, the word 'phoneme' and its variations are used in the meaning of any of the perceptually distinct units of sound in a specified language that form specific words in the language. The representation examples for phonemes in this disclosure are taken from the IPA (International Phonetic Alphabets), but are only for the purpose of representation, and the system can used with any other phonetic standards.

Throughout the specification, the phrase 'phonetics-based word', 'phonetics-based words', 'PBW', and their variations are used to denote spoken language words, regardless of spelling. For example "there" and "their" have different spellings, but have the same phonetics. The representation of PBW is based on language-independent phonemes, and may be inspired by IPA (International Phonetic Alphabets) standards, but may also use other language-independent phonetic standards.

Throughout the specification, the use of the phrase 'thought representation', 'TR', and their variations are used in the meaning of a language-independent representation of human thoughts.

The system disclosed in the present disclosure discloses an intermediate representation of words called as phonetics-based-words or spoken words. However, exact spellings are left to later units of a language understanding system. This disclosure uses novel techniques to derive phonetics-based words, which help the system to be highly efficient, and, hence be part of a real-time language understanding system.

Figure 1:
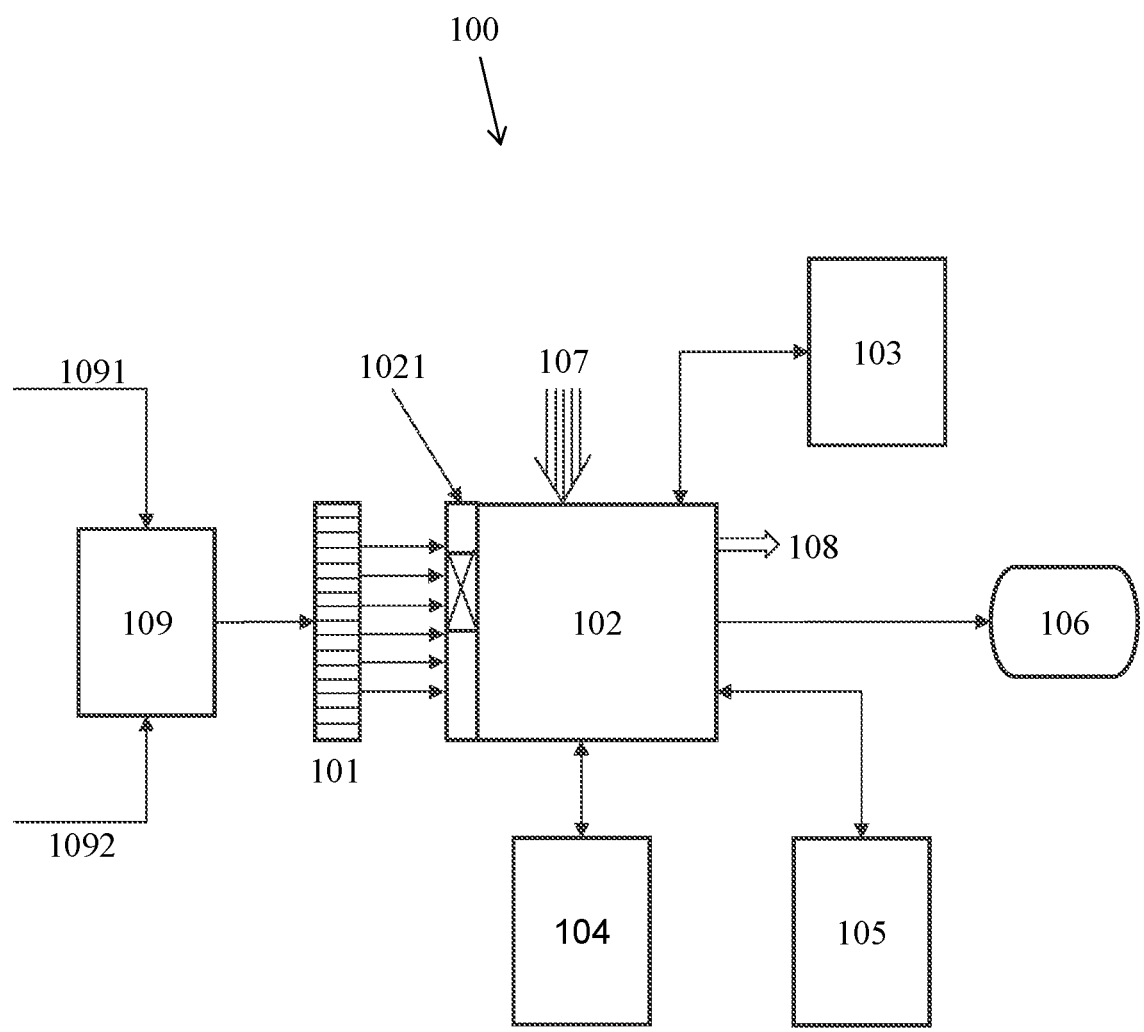
FIG. 1 illustrates an embodiment of a system to convert phonemes into phonetics-based words, in accordance with the present disclosure.

A system to convert phonemes into phonetics-based words is disclosed. As illustrated in FIG. 1, the system (100) comprises a phoneme enhancer (109), a phoneme sequence buffer (PSB) (101), a phoneme sequence to phonetics-based word converter (controller) (102) that comprises a sliding window phoneme sequence matcher (1021), a phoneme sequence to phonetics-based word custom data memory (103), a most frequent phonetics-based word predictive memory (104), a phoneme similarity matrix (PSM) (105), and a phonetics-based word output unit (106).

Usually, the present system (100) is used after a system which creates phonemes from a voice signal, also known as acoustic model, for Automatic Speech Recognition (ASR) or Speech-to-Text systems. The output of this system (100) can be consumed by meaning deduction systems or any Speech-to-Text (ASR) systems.

The phonemes are the basic unit of sounds received from a voice signal, which a human brain can break into. However, people know that, when hearing someone on phone, we tend to make mistakes in identifying the exact phonemes, especially, for similar sounding entities. It is necessary to spell out similar sounding entities to ensure the difference between sound (for example, the difference between "b" and "d"). However, such problems may not occur when talking face-to-face, the reason being the performance of lip reading and the reading of other visual hints, which are done simultaneously to resolve the sounds by the human brain.

The phoneme enhancer (109) takes both voice sounds (1091) as well as visual hints (1092) as inputs, and merges them to form a final phoneme. The visual hints may be based on International Phonetic Association (IPA) pulmonic or non-pulmonic headers, or any other headers. These headers indicate unique use of various human body parts involved in sound creation, like lip, teeth, tongue, etc. The pulmonic headers, for example, include Bilabial, Labiodental, Dental, Alveolar, etc. However, the system (100) need not follow these, and can use other visual hint classifications to arrive at an optimal solution. The phoneme enhancer (109) merges both the voice phonemes (1091) and the visual hints (1092) to disambiguate the phonemes.

The phoneme sequence buffer (101) facilitates the storing of an incoming sequence of phonemes, until they are clustered into a meaningful TR. As soon as a sequence of phonemes is created and well-connected into a TR, that particular sequence of phonemes is removed from the buffer (101).

The phoneme sequence to phonetics-based word custom data memory (PCDM) (103) is an associative memory, which can either be a look-up memory, or can also be implemented using any statistical Artificial Intelligence (AI) modeling, such as Artificial Neural Networks or other methods. It takes a sequence of phonemes as input and outputs either a fully matching PBW or most matching PBW.

The PCDM (103) may also optionally store the possible PBW matches for a partial sequence. The PCDM (103) can also optionally output top possible formations of PBW for partial sequences, so that the controller (102) can look ahead in the formation of PBW, instead of sending the query again to the PCDM (103). The PCDM (103) can also prioritize one PBW over others, if multiple options exist, based on Differentially Prioritized Access Algorithm.

The functionalities of the PCDM (103) are explained below:
1. Associative Memory: It acts like a simple associative memory or key store kind of memory. However implementation can be done via any implementation, like probabilistic graphical models in symbolic domain like Markov chains, or can also be implemented using Neural Networks or Ensemble AI methods.
Input or key is the sequence of phonemes decided by the controller (102), while what is returned is whether they form a PBW or most probable PBW. For example, given a phoneme sequence ("t", "e", "s", "t"), it would return a valid PBW output called ("test"). Similarly, another sequence of ("t", "e", "s") would return an invalid PBW, but would also return that it can form ("test"), provided the phoneme contains a succeeding ("t").
In another scenario of most probable PBW match—for an input ("d", "e", "t", "t", "e", "r"), it would return ("better") as a possible PBW. Associative memory would return all the three output types, when there is no successful PBW found or PBW is found. For example, for an input sequence of ("b", "a", "t"), it would return matched PBW as ("bat"), but also probably output PBW's such as ("bad", "bet"), and may be even ("better") if ("t", "e", "r") are the following phonemes.
2. Differentially Prioritized Access: The associative memory should have property to prioritized access to certain output than others, based on recency and frequency of the item used. Phonemes sequence will always point to a single valid PBW, because PBW are not based on spelling, but how words are pronounced. But humans have different dialects and often deviate from ideal pronunciation. When this happens, there could be different possible outputs, which are most probable. For example, assume a person pronounces "bed" English word as ("b", "a", "d") due to varied dialect. In this case, the output could be the perfect match as "bad", but will also output possible other best matches like "bat", "bed", etc. Now, these different options will be given different probabilities, which will be based on most recent and most frequent best success for this particular use.
The differential prioritized access increases probability of certain items which were used most recently or very frequently in past. Varying mathematical models can be given to this concept, along with other statistical probabilities to arrive at probabilities.

The most frequent phonetics-based word predictive memory (PPM) (104) is configured to imitate a human brain, which can predict what could come next. For example, when someone says "I am going to", the human brain can predict what words or type of words could possibly come next. These are stored as memories in the human brain. The word predictive memory (104) also works like the human brain in such situations.

This memory (104) is a special custom memory, which, for a given input sequence, can predict the next output with many other attributes related to the input. However, this is useful for most frequent words only. Our studies on various corpuses have shown that less than 1,000 words account for up to 75% frequency of words in a text corpus. For example, there are a few words like "I", "he", "she", "is", "am", "are", "has", "there", etc., which are very frequently used.

The controller (102) will not just be given PBWs from PCDM (103), but also expected next PBW to pick from. With this feature, there is increased performance, where highly accurate PBWs are converged really quickly. This feature is also helpful in finding the word boundaries faster. In most languages, especially in English, the most frequent words mentioned above are very useful in defining most of the word boundaries.

The key functionalities of the PPM (104) are as follows:
1. Given a sequence of PBWs, what would be next predicted PBWs. For example, given PBW equivalents of English words "My name", it can be understood that getting "is" PBW is of very high probability and, if the same is got as utterances, than it is easy to break the word boundaries.

2. May take context with sequence of input in some form. The meaning of PBWs may be different depending on the context in which it is being talked about. Hence, the context may also be used along with PBW sequence. By context, the successful PBW's which were encountered in previous utterances might be repeated again, for example a particular name of a person on pronoun or disease or symptom etc.

The phoneme similarity matrix (105) is a simple key value store which has a list of phonemes which are similar (for example, "p" and "b"). The aim of this matrix is to resolve possible conflicting words by using similar sounding phonemes, instead of actual ones, to reason if it is possible to formulate a better PBW for a meaningful TR.

The similarity matrix (105) would be used by the controller (102) to replace some of the phonemes with similar phonemes to see a match with most probable PBW sent by the PCDM (103). This is similar to human brain reasoning, which tends to alter the phoneme to say what a person might have tried to say.

It may happen that non-frequent words and similar sounding words may create confusion in picking up the right PBW. Similar sounding phonemes may create different PBWs or spoken words. For example "doss" vs "boss". In case the incoming phoneme does not seem to form a valid meaningful PBW, the PSM (105) could be used to figure out if changing some phonemes to similar ones can form a better PBW.

The phoneme sequence to phonetics-based word converter (102) takes phoneme sequences as input from the phoneme sequence buffer (101) and uses sliding dynamic width window technique (1021) over these phonemes to create a sequence of best possible phonetics-based words. The controller (102) is the heart of the system (100), which controls all the data flow across various other modules and does reasoning, prioritization, disambiguation etc. The controller (102) uses the outputs from the PCDM (103), the PPM (104), and the PSM (105) to get the best possible PBW sequence.

In an embodiment of the present disclosure, the sliding window is of varying size, working greedy to pick up the best PBWs, and then jump to the next. For example, in a total length of 10, an initial window starts at the beginning (1), with a length of 1. Then, the length keeps increasing until a valid PBW is formed. Let us say a PBW is formed at a length of 3; then a sliding window will start from location 4 with a size of 1. Again, the same procedure as above is followed. However, the sliding window can follow any other approach or technique to arrive at best possible PBWs.

Let us say the system has a phoneme sequence of "My Kart is full." In this case, while moving, the taken phoneme sequence of "Kar" could match to "car", but when the window is increased further to check if a better word can be taken, "Kart" is recognized as a better word match. The window is sliding as well as variable width. The reason for doing this is that window can even go back to previously picked words to better match new words for getting better meaningful thought.

Figure 2:
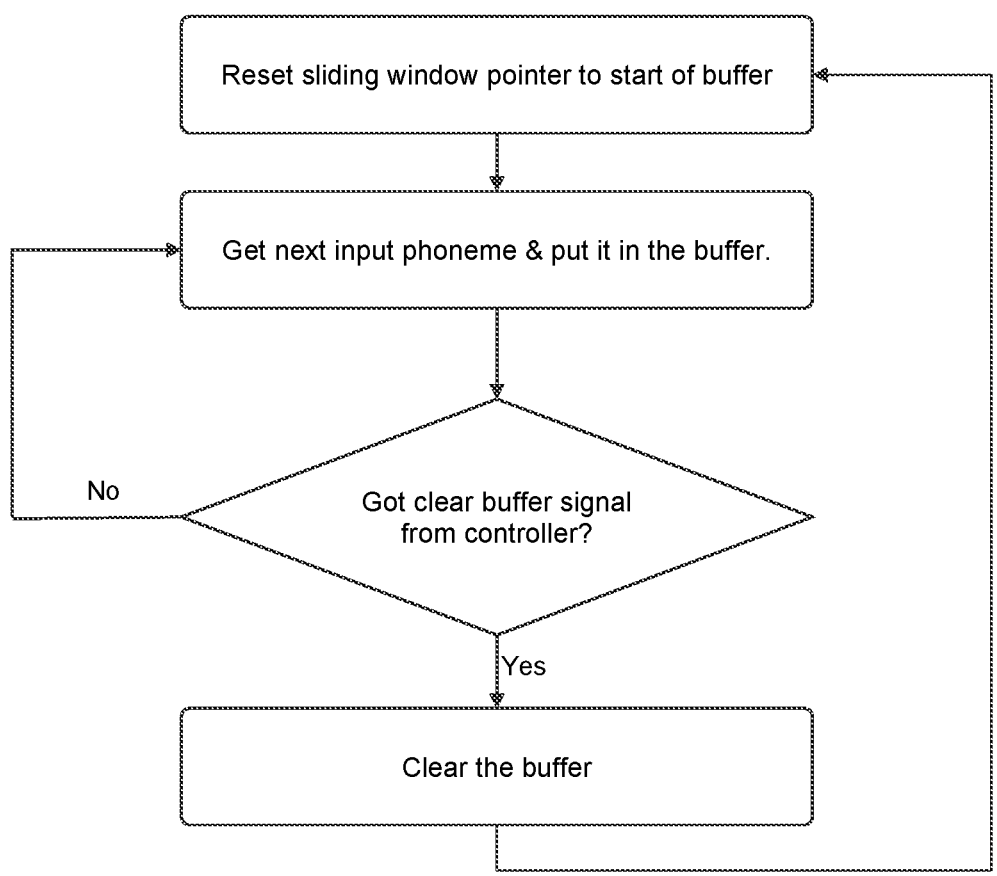
FIG. 2 and FIG. 3 illustrate flowcharts of the working of a phoneme sequence to phonetics-based word converter, in an embodiment of a system to convert phonemes into phonetics-based words, in accordance with the present disclosure.
Figure 3:
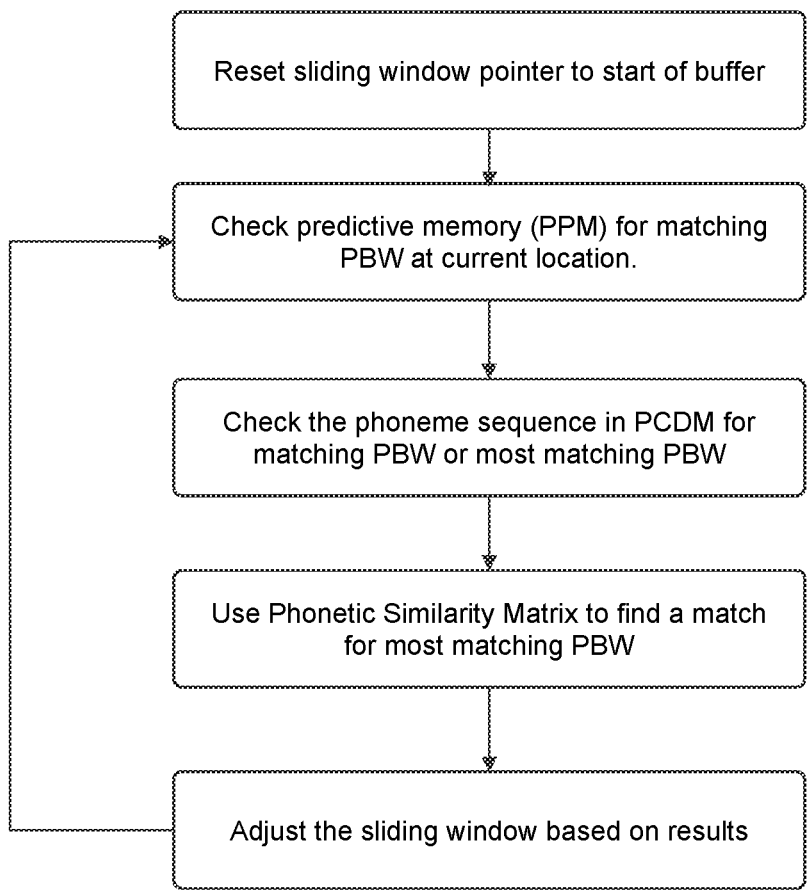

As illustrated in FIG. 2 and FIG. 3, the functionalities of the controller (102) are given below:
1. It maintains a pointer to the sliding window of the buffer (101). Sliding window will have start and end points in the buffer (101) to choose phonemes from. This window location and size is altered based on different trial strategies to arrive at a particular successful PBW.
2. It also maintains the sequence of successful PBW out till now until the full meaning is sorted. This is used for predicting next PBW.
3. It sends the successful sequence of PBW till now to PPM (104) to fetch next expected PBWs.
4. It uses the output from the PPM (104) to see if any most frequent PBWs can be formed. If those phoneme sequences are received, a direct inference is made without going to the PCDM (103).
5. It sends the phoneme sequence in current sliding window to the PCDM (103) to get matched PBW's, or most probable nearest matched PBWs, and also list of PBWs which can be formed if specific upcoming phoneme sequences are encountered.
6. It uses the output from the PCDM (103) in greedy way to form PBWs. The greedy way here may mean that multiple PBWs can be combined to form a larger PBW.
7. If PBWs are not made successfully, it can use the phoneme similarity matrix (105) to see if replacing one or more of the phonemes with similar phonemes can lead to a better PBW. This is done not just for the PCDM (103) output, but also the PPM (104) output or any other output by which a PBW is being formed.
8. In this whole process, the sliding windows are incremented and adjusted. Similarly the buffer (101) is cleared on successful completion of sentence, based on status signal from one or more external systems.

The output of the phoneme sequence to phonetics-based word converter (102) is then sent forward for checking the meaning. The phoneme sequence to phonetics-based word converter (102) interacts with a master controller/main controller of a language understanding system to send (108) and receive (107) signals.

The phonetics-based word output unit (106) comprises the sequence of phonetics-based words that are output from the system (100).

In an embodiment of the present disclosure, the system (100) may be implemented in one or more computing systems, in association with a system that provides required inputs to the present system (100). The computing system may work on a networked environment. The network may be the Internet, a virtual private network, a local area network, a wide area network, a broadband digital network, or any other appropriate structure for enabling communication between two or more nodes or locations. The network may include a shared, public, or private data network. Further, the network may encompass a wide area or local area, and may include one or more wired and/or wireless connections.

In another embodiment of the present disclosure, the computing systems may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Throughout the specification, the system (100) does not use the actual phonetic form of PBWs, rather it uses plain English spelling to represent PBWs. It is easy to convert English words into PBW. For example, the word "test" is represented as "tɛst". Similarly, the word "done" is represented as "dʌn". The system (100) uses International Phonetic Alphabets (IPA) phonetic standards to represent phonetics-based representation of words.

It will be apparent to a person skilled in the art that the above description is for illustrative purposes only and should not be considered as limiting. Various modifications, additions, alterations and improvements without deviating from the spirit and the scope of the disclosure may be made by a person skilled in the art. Such modifications, additions, alterations and improvements should be construed as being within the scope of this disclosure.

LIST OF REFERENCE NUMERALS

100—A System to Convert Phonemes Into Phonetics-based Words
101—Phoneme Sequence Buffer
102—Phoneme Sequence to Phonetics-Based Word Converter
1021—Sliding Window Phoneme Sequence Matcher
103—Phoneme Sequence to Phonetics-Based Word Custom Data Memory
104—Most Frequent Phonetics-Based Word Predictive Memory
105—Phoneme Similarity Matrix
106—Phonetics-Based Word Output Unit
107—One or More Feedback from a Main Controller
108—Status Signal to the Main Controller of the Language Understanding System
109—Phoneme Enhancer

We claim:

1. A system to convert phonemes into phonetics-based words that is implemented in one or more computing systems in association with a system that provides required inputs, comprising:
a phoneme enhancer that takes both voice sounds and visual hints as inputs, and merges them to form a phoneme;
a phoneme sequence buffer that facilitates the storing of an incoming sequence of phonemes, until it is clustered into a meaningful thought representation;
a phoneme sequence to phonetics-based word custom data memory that takes a sequence of phonemes as input, and outputs: either a fully matching phonetics-based word, or a most matching phonetics-based word;
a most frequent phonetics-based word predictive memory that is configured to imitate a human brain, which can predict what could come next;
a phoneme similarity matrix that is a key value store, which has a list of phonemes that are similar;
a phoneme sequence to phonetics-based word converter that controls all the data flow across various other modules and does reasoning, prioritization, and disambiguation, said phoneme sequence to phonetics-based word converter taking phoneme sequences as input from the phoneme sequence to phonetics-based word custom data memory, the phonetics-based word predictive memory, and the phoneme similarity matrix, to get the best possible phonetics-based word sequence, with: the phoneme sequence to phonetics-based word converter interacting with a master controller of a language understanding system to send and receive signals, said output being forwarded for checking the meaning, wherein the phoneme sequence to phonetics-based word converter uses a sliding dynamic width window to create the best possible phonetics-based word sequence, wherein the sliding dynamic width window starts at a given location of the phoneme sequence buffer and incrementally increases in width until a phonetics-based word is identified and then the width resets and the sliding dynamic width window moves to a next location of the phoneme sequence buffer to identify a next phonetics-based word, wherein the sliding dynamic width window works in greedy way to form phonetics-based words by combining multiple previously identified phonetics-based words to form larger phonetics-based words, and wherein the sliding dynamic width window can also move back to a previous location of the phoneme sequence buffer to identify different phonetics-based words by altering the width of the sliding dynamic width window for more meaningful thought representations; and
a phonetics-based word output unit that comprises the sequence of phonetics-based words that are output from the system.

2. The system to convert phonemes into phonetics-based words as claimed in claim 1, wherein the phoneme sequence to phonetics-based word custom data memory is an associative memory, which is either a look-up memory or is implemented using any statistical Artificial Intelligence modeling.

3. The system to convert phonemes into phonetics-based words as claimed in claim 1, wherein the system uses International Phonetic Alphabets phonetic standards to represent phonetics-based representation of words.

* * * * *